(12) United States Patent
Kodama et al.

(10) Patent No.: US 7,245,775 B2
(45) Date of Patent: Jul. 17, 2007

(54) IMAGE PROCESSING APPARATUS FOR COMPOSITING IMAGES

(75) Inventors: Taku Kodama, Kanagawa (JP); Yasuyuki Nomizu, Kanagawa (JP); Junichi Hara, Kanagawa (JP); Toshio Miyazawa, Kanagawa (JP); Hiroyuki Sakuyama, Tokyo (JP); Yasuyuki Shinkai, Kanagawa (JP); Nekka Matsuura, Kanagawa (JP); Takanori Yano, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 778 days.

(21) Appl. No.: 10/646,754

(22) Filed: Aug. 25, 2003

(65) Prior Publication Data
US 2004/0109610 A1    Jun. 10, 2004

(30) Foreign Application Priority Data
Aug. 26, 2002  (JP)  ............................ 2002-244877
Jan. 7, 2003   (JP)  ............................ 2003-001227

(51) Int. Cl.
G06K 9/36    (2006.01)
H04B 1/66    (2006.01)

(52) U.S. Cl. .................................. 382/240; 375/240.19
(58) Field of Classification Search ................ 382/173, 382/232–233, 240, 250, 251; 375/240, 240.03, 375/240.19
See application file for complete search history.

(56) References Cited

U.S. PATENT DOCUMENTS 6,571,071 B2    5/2003  Kanoshima et al.
6,686,955 B1    2/2004  Fields et al.
6,792,150 B1 *  9/2004  Satoh ........................... 382/238
6,804,405 B2 * 10/2004  Christopoulos et al. ..... 382/243
6,832,001 B1 * 12/2004  Kashiwagi ................... 382/166
2001/0050778 A1 12/2001  Fukuda et al.
2002/0159644 A1 10/2002  Sakuyama (Continued)

FOREIGN PATENT DOCUMENTS

JP          6-73977          10/1994

(Continued)

OTHER PUBLICATIONS

U.S. Appl. No. 10/986,781, filed Nov. 15, 2004, Matsuura et al.

(Continued)

*Primary Examiner*—Kanjibhai Patel
(74) *Attorney, Agent, or Firm*—Oblon, Spivak, McClelland, Maier & Neustadt, P.C.

(57) ABSTRACT

An image processing apparatus for compositing multiple component images into a composite image is proposed. The image processing apparatus includes: a separating unit that separates a codestream corresponding to each one of the component images into a header portion and a data portion; a header processing unit that edits the separated header portion; and a codestream generation unit that generates a codestream corresponding to the composite image by combining the edited headers and the separated data portions. Each component codestream is generated by dividing the corresponding one of the component images into one or more rectangular regions, transforming pixel values of the divided one or more rectangular regions with discrete wavelet transform into transform coefficients, and compressing the transform coefficients.

11 Claims, 14 Drawing Sheets

U.S. PATENT DOCUMENTS

| | | | |
|---|---|---|---|
| 2003/0018818 A1* | 1/2003 | Boliek et al. | 709/247 |
| 2003/0095272 A1 | 5/2003 | Nomizu | |
| 2003/0137695 A1 | 7/2003 | Nomizu | |
| 2004/0109610 A1 | 6/2004 | Kodama et al. | |

FOREIGN PATENT DOCUMENTS

| | | |
|---|---|---|
| JP | 10-322542 | 12/1998 |
| JP | 11-127340 | 5/1999 |
| JP | 2000-156829 | 6/2000 |
| JP | 2000-156830 | 6/2000 |
| JP | 2000-236507 | 8/2000 |
| JP | 2001-148774 | 5/2001 |

OTHER PUBLICATIONS

U.S. Appl. No. 10/372,479, filed Feb. 21, 2003.
U.S. Appl. No. 10/390,193, filed Mar. 14, 2003.
U.S. Appl. No. 10/390,263, filed Mar. 14, 2003.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/847,192, filed May 2, 2001, Fukuda et al.
U.S. Appl. No. 09/725,569, filed Nov. 30, 2000, Namizuka et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shoji et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/962,580, filed Sep. 26, 2001, Saitoh et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/272,857, filed Oct. 18, 2002, Watanabe et al.
U.S. Appl. No. 10/379,533, filed Mar. 6, 2003, Takeyama et al.
U.S. Appl. No. 10/646,754, filed Aug. 25, 2003, Kodama et al.
U.S. Appl. No. 10/769,855, filed Feb. 3, 2004, Watanabe et al.

* cited by examiner

DECOMPOSITION_LEVEL1_0

DECOMPOSITION_LEVEL1_1

DECOMPOSITION_LEVEL1_2

DECOMPOSITION_LEVEL1_3

IMAGE PROCESSING APPARATUS FOR COMPOSITING IMAGES

BACKGROUND OF THE INVENTION

1. Field of the Invention

The present invention generally relates to an image processing apparatus and an image forming apparatus, and more particularly, to an image processing apparatus that forms an image in which a plurality of component images are composited (formed into a composite image), an image forming apparatus in which the image processing apparatus is provided, a computer program that causes a computer to function as the image processing apparatus, and a computer readable recording medium storing the computer program.

2. Description of the Related Art

JPEG is one of the most widely used image compression/decompression algorithms. JPEG 2000, a successive technique to JPEG, is a further improved algorithm that offers higher performance and various additional functions. JPEG 2000 is expected to become the de facto standard of the next generation that realizes superfine compression/decompression of still pictures.

Recent improvements in the precision of image forming apparatuses have enabled one to composite a plurality of pages into fewer pages. The rapid growth in information available through computers as well as concerns about environmental problems increase demand for such compositing of pages.

Conventionally, each image is decompressed, expanded in a memory, and shrunk to a certain size, if necessary.

The conventional technique of compositing images, however, requires much more time and memory space than processing of single images does. Users need to prepare more memory capacity and spend more time to process the compositing of images than to process the images as they are.

To solve such problems, Japanese Patent Laid-open Application No. 2000-156829 discloses an invention to save memory capacity by processing the compositing of images by lines or alternative small units.

Japanese Patent Laid-open Application No. 2000-156830 discloses an invention in which an additional buffer is provided so as to accelerate the compositing of images.

Additionally, Japanese Patent Laid-open Application No. 2001-148774 discloses an invention in which users can designate the number of images to be composited.

Japanese Patent Laid-open Application No. 10-322542 discloses an invention for the compositing of previously composited images.

The inventions disclosed in the above first and second references, however, cannot solve the problem that each image to be composited is expanded in the memory one by one, taking much more time than processing of single images.

Neither of the inventions disclosed in the above third and fourth references is the solution to the problem.

SUMMARY OF THE INVENTION

Accordingly, it is a general object of the present invention to provide a novel and useful image processing apparatus with which at least one of the above problems is solved.

More particularly, it is an object of the present invention to composite a plurality of component images and to decomposite a composite image easily without expanding all the component images in the memory.

Yet another object of the present invention is to reduce the memory size of the composite images, which results in saving memory capacity required for storing the composite images.

To achieve one or more of the above objects, an image processing apparatus, according to an aspect of the present invention, for compositing a plurality of component images into a composite image, includes: a separating unit that separates a codestream corresponding to each one of the plurality of component images into a header portion and a data portion, wherein said codestream is generated by dividing the corresponding one of the plurality of component images into one or more rectangular regions, transforming pixel values of the divided one or more rectangular regions with discrete wavelet transform into transform coefficients, and compressing said transform coefficients; a header processing unit that edits said separated header portion so as to compose the plurality of component images into said composite image; and a codestream generation unit that generates a codestream corresponding to said composite image by combining the edited headers and the separated data portions.

Accordingly, the plurality of component images can be composited into a composite image without repeatedly expanding each component image in the memory.

Additionally, only a portion of code data that is needed for the composite image is retained, and the remaining portion of the code data that is not needed for the composite image is abandoned. Accordingly, the file size of the composite image can be reduced, and the memory capacity required for storing the composite image can be reduced.

The image processing apparatus, according to another aspect of the present invention, further includes a composite designating unit that designates a number of component images to be composited in said composite image; wherein said header processing unit edits said separated header portion based on the designated number of component images.

Accordingly, the number of component images to be composited can be designated. A user can designate the number of component images that the user desires to composite.

The image processing apparatus according to yet another aspect of the present invention is characterized in that said composite designating unit designates at least one of the number of component images in horizontal directions and at least one of the number of component images in vertical directions.

Accordingly, the number of component images to be composited can be designated by designating the number in the horizontal directions and/or the number in the vertical directions.

The image processing apparatus according to yet another aspect of the present invention further includes a code data processing unit that extracts predetermined code data of said separated data portion.

Accordingly, only a portion of code data that is needed for the composite image is retained, and the remaining portion of the code data that is not needed for the composite image is abandoned. Accordingly, the data amount of the composite image can be reduced, and the memory capacity required for storing the composite image can be reduced.

An image processing apparatus according to yet another aspect of the present invention, for decompositing (separating) a composite image into a plurality of component images, includes: a separating unit that separates a codestream corresponding to said composite image into header portions and data portions, wherein said codestream is generated by dividing the corresponding composite image into one or more rectangular regions, transforming pixel values of the divided one or more rectangular regions with discrete wavelet transform into transform coefficients, and compressing said transform coefficients; a header processing unit that edits said separated header portions so as to generate a plurality of new codestreams corresponding to said component images; and a codestream generation unit that generates a plurality of new codestreams corresponding to said component images by combining the edited headers and the separated data portions.

Accordingly, the image processing apparatus can easily decomposite a composite image without expanding the composite image in the memory.

An image forming apparatus according to yet another aspect of the present invention includes: an image input unit that reads an image of a document; an image compression coder unit that generates a single codestream by dividing the read image into one or more rectangular regions, transforming pixel values of the divided one or more rectangular regions with discrete wavelet transform into transform coefficients, and compressing said transform coefficients; an image processing apparatus as claimed in claim 1; and a printer engine that forms an image on a recording medium based on each codestream generated by said codestream generation unit of said image processing apparatus.

Accordingly, the image forming apparatus can easily composite a plurality of component images into a composite image without repeatedly expanding each component image in the memory.

Other objects, features, and advantages of the present invention will become more apparent from the following detailed description when read in conjunction with the accompanying drawings.

DETAILED DESCRIPTION OF THE PREFERRED EMBODIMENTS

[JPEG 2000 Algorithm]

The algorithm of JPEG 2000 related to the preferred embodiments of the present invention is described below.

Figure 1:
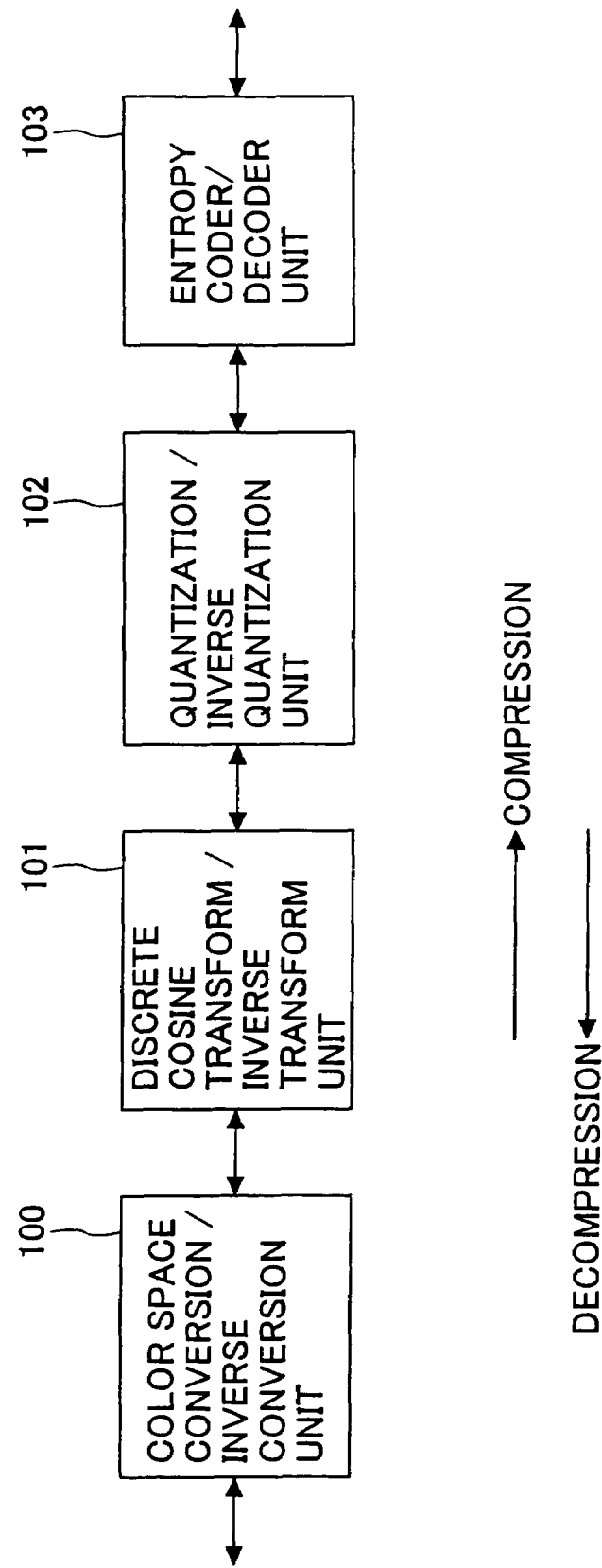
FIG. 1 is a block diagram for explaining the JPEG algorithm.

FIG. 1 is a block diagram for explaining the algorithm of JPEG. The JPEG algorithm is configured with a color space conversion/inverse conversion unit 100, a discrete cosine transform/inverse transform unit 101, a quantization/inverse quantization unit 102, and an entropy coder/decoder unit 103. Generally, non-reversible coding is used so as to gain a high compression ratio. That is, it is impossible to recover all the image data by decompressing the compressed image data. In other words, lossy compression is used more often than lossless compression. Even the lossy compression does not cause any problem in practice. The JPEG algorithm contributes to reducing memory capacity required for compression and decompression of image data and for storage of the compressed image data, and to reducing time required for exchanging the compressed image data. These advantages have positioned JPEG as the most widely used algorithm for compressing/decompressing still images.

Although JPEG is one of the most successful conventional image compression techniques, JPEG still has problems that become apparent as users demand higher and higher resolution. In the case of high resolution still images, block noise and mosquito noise, for example, are apparent. The degradation of image quality is not ignorable.

The image quality of low bit rate, that is, high compression rate, needs to be improved to solve such problems. JPEG 2000, expected to be a solution, has been created by intensive studies of the compression algorithm requirements of the next generation. JPEG 2000 is expected to be used in parallel with JPEG.

Figure 2:
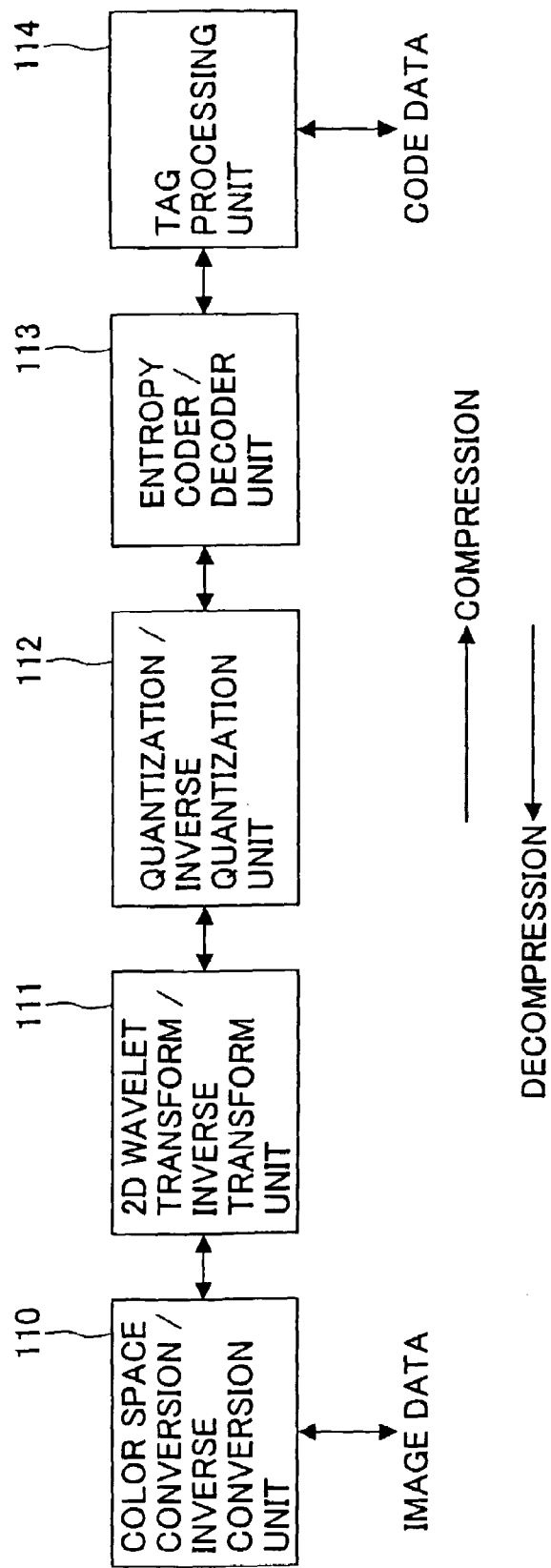
FIG. 2 is a block diagram for explaining the JPEG 2000 algorithm.
Figure 3A:
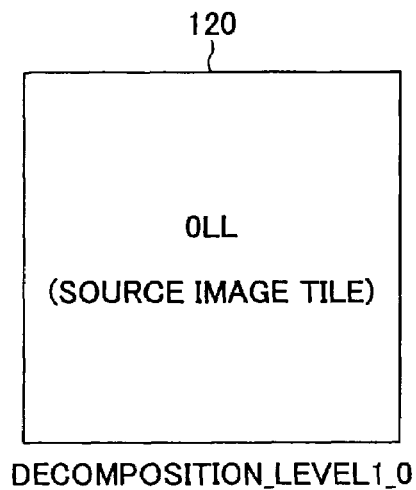
FIGS. 3A-3D are schematic diagrams showing sub-bands in the case that the decomposition level is three.
Figure 3B:
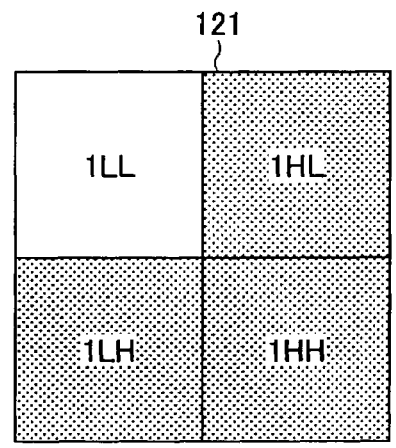
Figure 3C:
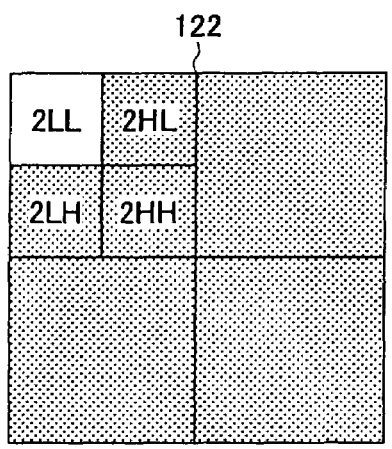
Figure 3D:
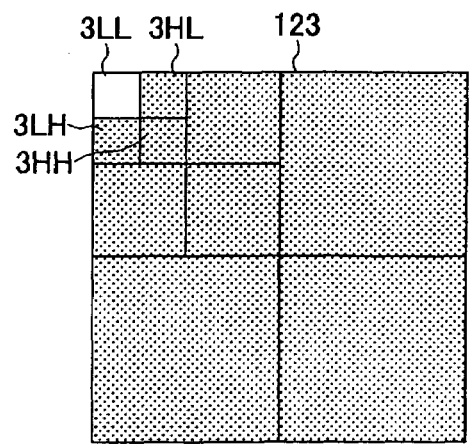

FIG. 2 is a block diagram for explaining the algorithm of JPEG 2000. The algorithm of JPEG 2000 is configured with a color space converting/inverse converting unit 110, a 2D wavelet transform/inverse transform unit 111, a quantization/inverse quantization unit 112, an entropy coder/decoder unit 113, and a tag processing unit 114.

As is apparent from the comparison of FIGS. 1 and 2, the JPEG algorithm and the JPEG 2000 algorithm are different in the transforming method. JPEG uses Discrete Cosine Transform (DCT), and JPEG 2000 uses Discrete Wavelet Transform (DWT). JPEG 2000 uses DWT because, compared with DCT, DWT provides images of higher quality.

Another difference between JPEG and JPEG 2000 is the tag processing unit 114 provided only in the final stage of JPEG 2000. The tag processing unit 114 creates and interprets codestreams.

The codestreams realize various useful functions of JPEG 2000. FIGS. 3A-3D are schematic diagrams illustrating sub-bands of each decomposition level in the case that the decomposition level is three. It is possible to compress and decompress the tile-components of a still image up to any octave decomposition level.

As shown in FIGS. 1 and 2, the color space converting/inverse converting units 100 and 110 are often provided at the first stage of the JPEG and JPEG 2000 algorithms, respectively. The color space converting/inverse converting units 100 and 110 convert image data represented in Red, Green, and Blue (RGB) color space or Yellow, Magenta, and Cyan (YMC) color space into image data represented in YCrCb color space or YUV color space.

The algorithm of JPEG 2000 is described below. Technical terms related to JPEG 2000 are defined in JPEG 2000 Part 1, Final Draft International Standard (FDIS). Some representative technical terms are defined as follows:

1. Code-block: A rectangular grouping of coefficients from the same sub-band of a tile-component.

2. Decomposition level: A collection of wavelet sub-bands where each coefficient has the same spatial impact or span with respect to the source component samples. These include the HL, LH, and HH sub-bands of the same 2-dimensional sub-band decomposition. For the last decomposition level the LL sub-band is also included.

3. Precinct: A rectangular sub-divition of a transformed tile-component, within each resolution level, used for limiting the size of packets.

4. Layer: A collection of compressed image data from coding passes of one, or more, code-blocks of a tile component. Layers have an order for encoding and decoding that must be preserved.

5. Region of interest (ROI): A collection of coefficients that are considered of particular relevance by some user-defined measure.

Figure 4:
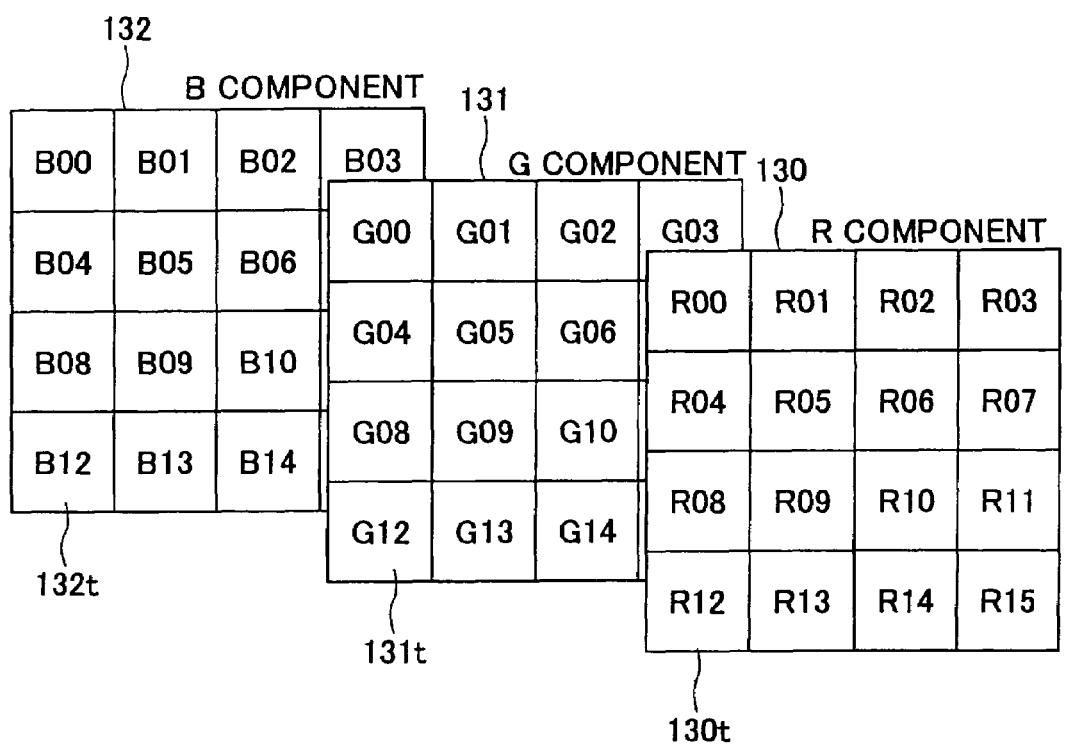
FIG. 4 is a schematic diagram showing components of a color image divided into tiles.

FIG. 4 is a schematic drawing illustrating tile-divided components of a color image. As shown in FIG. 4, components 130, 131, and 132 (represented using RGB color space, in this case) of the color image are divided into a plurality of square regions (tiles) 130$t$, 131$t$, and 132$t$, respectively. The compression and decompression processes are performed by tiles: R00, . . . , R15, G00, . . . , G15, B00, . . . B15. Accordingly, the compression and decompression are independently performed for each component and each tile.

When the color image is compressed, the image data of each tile of each component of the color image is input to the color space controlling unit 110 shown in FIG. 2. After being converted into another color space, the image data are transformed with 2D wavelet transform by the 2D wavelet transform into a frequency domain.

As described above, FIG. 3 shows sub-bands of each decomposition level in the case that the decomposition level is three. The 2D wavelet transform is applied to a tile original image (reference numeral 120) (0LL) (the decomposition level is zero) obtained by tile-dividing the source image, and the tile source image is separated into sub-bands 1LL, 1HL, 1LH, and 1HH of the decomposition level 1 (reference numeral 121). Then, the 2D wavelet transform is further applied to the low frequency component 1LL of this level, and sub-bands 2LL, 2HL, 2LH, and 2HH of the decomposition level 2 (reference numeral 122) are separated. Likewise, the 2D wavelet transform is applied to the low frequency component 2LL, and sub-bands 3LL, 3HL, 3LH, and 3HH of the decomposition level 3 are separated (reference numeral 123).

In addition, the sub-bands of each decomposition level that are to be encoded are shaded in FIG. 3. The sub-bands 3HL, 3LH, 3HH, 2HL, 2LH, 2HH, 1HL, 1LH, and 1HH are to be encoded and the sub-band 3LL is not encoded in the case that the decomposition level is 3 shown in FIG. 3.

Bits are encoded in a designated order. The quantization unit 112 shown in FIG. 2 generates contexts based on bits adjacent to the bit to be encoded. The quantized wavelet coefficients are divided into non-overlapping rectangular portions called "precincts" within a sub-band. "Precinct" is introduced in order to efficiently use memory space when JPEG 2000 is implemented.

Figure 5:
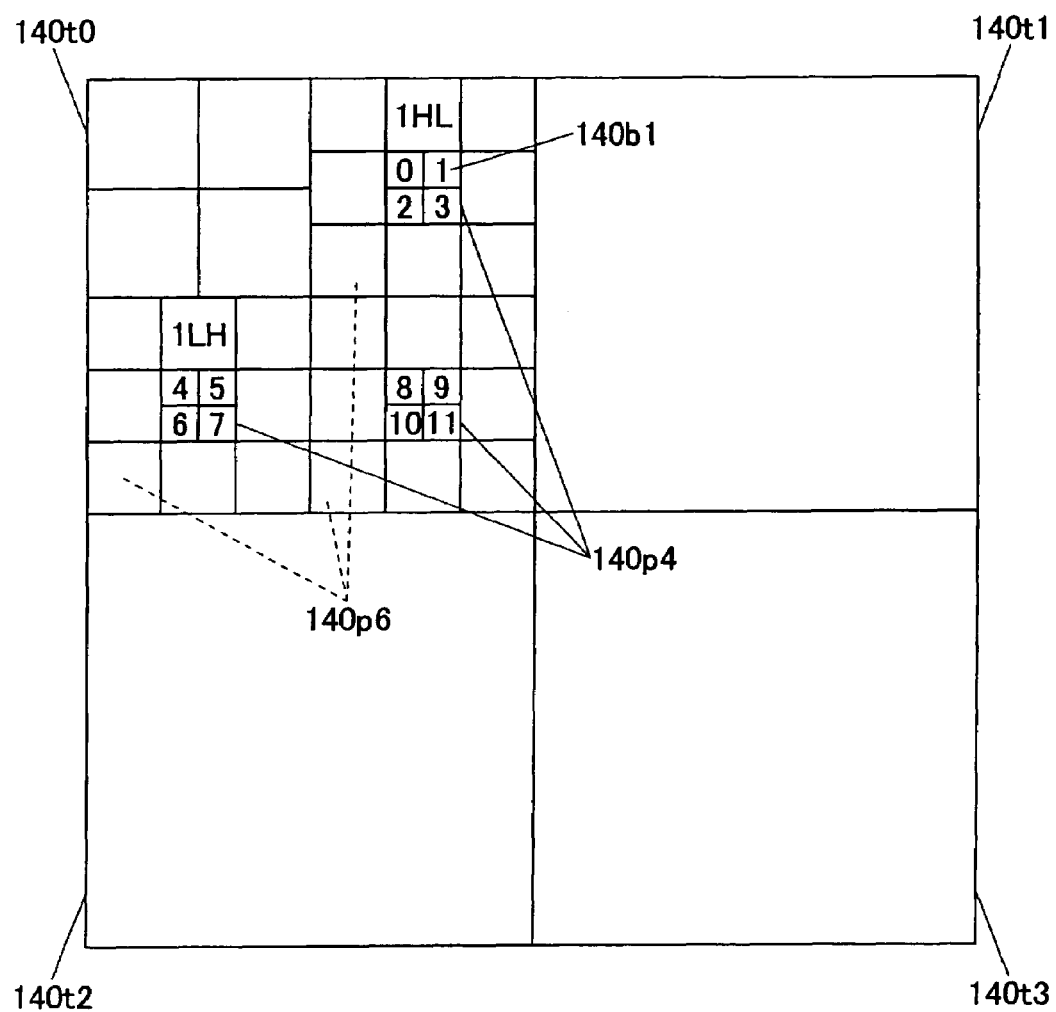
FIG. 5 is a schematic diagram for explaining the relationship between precincts and code-blocks.

FIG. 5 is a schematic diagram for explaining the relationship between a precinct and a code-block. The source image 140 is divided into four tiles 140$t$0, 140$t$1, 140$t$2, and 140$t$3 in the decomposition level 1. As shown in FIG. 5, a precinct 140$p$4, for example, is made of three rectangle regions that spatially correspond to each other. A precinct 140$p$6 is made in the same manner. The precincts are numbered from 0 to 8 in raster order. Each precinct is divided into non-overlapping rectangular blocks called code-blocks. In this case, the precinct 140$p$4 is divided into twelve code-blocks 0-11. A code-block 140$b$1 indicates a code-block No. 1. A code-block is a unit for entropy coding.

Coefficients obtained by wavelet transformation may be quantized as is into codes. The coefficients may be divided into "bit planes" so as to increase the efficiency of coding. The bit planes are ordered by pixels or code-blocks.

Figure 6:
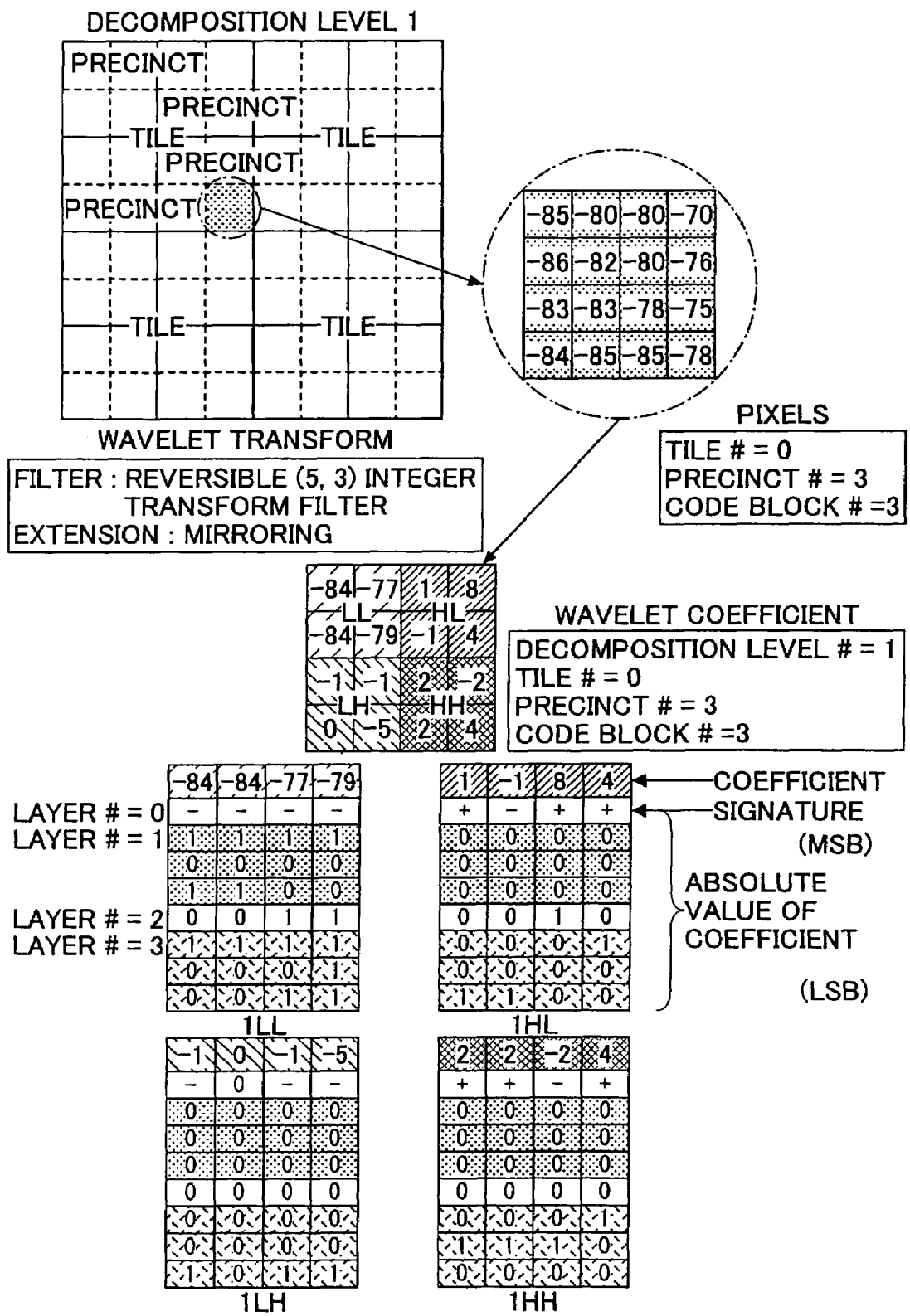
FIG. 6 is a schematic diagram showing steps of dividing transform coefficient by a bit-plane and ordering bit-planes by pixels or code-blocks.

FIG. 6 is a schematic diagram for explaining the process of the ordering. FIG. 6 shows the case in which the source image (32×32 pixels) is divided into four tiles (16×16 pixels), and the size of a precinct and a code-block of the decomposition level 1 is 8×8 pixels and 4×4 pixels, respectively. The precincts and the code-blocks are numbered in raster order.

When pixels need to be extended to the exterior of a tile, a mirroring method is used. The wavelet transformation is performed with a reversible (5, 3) filer. The wavelet coefficients of the decomposition level 1 are determined as described above.

A representative "layer" of tile 0, precinct 3, code-block 3 is also shown in FIG. 6. One may easily understand the structure of a layer by looking at the wavelet coefficients in the direction of the bit plane. A layer is made of one or more bit planes. In this case, the layers 0, 1, 2, 3 are made of three bit planes 1, 3, 1. The closer to LSB is a bit plane included in a layer, the earlier the layer is quantized. To the contrary, the closer to MSB is a bit plane included in a layer, the later the layer is quantized. Discarding layers that are closer to LSB in the order of closeness is called truncation. The quantizing rate can be finely adjusted with truncation.

The entropy encoding unit 113 shown in FIG. 2 encodes tiles of each component by stochastic estimation based on context and bits to be encoded. All components of the source image are encoded by tiles. The tag processing unit 114 combines all encoded data from the entropy encoding unit 113 into a codestream, and attaches a tag to the codestream.

Figure 7:
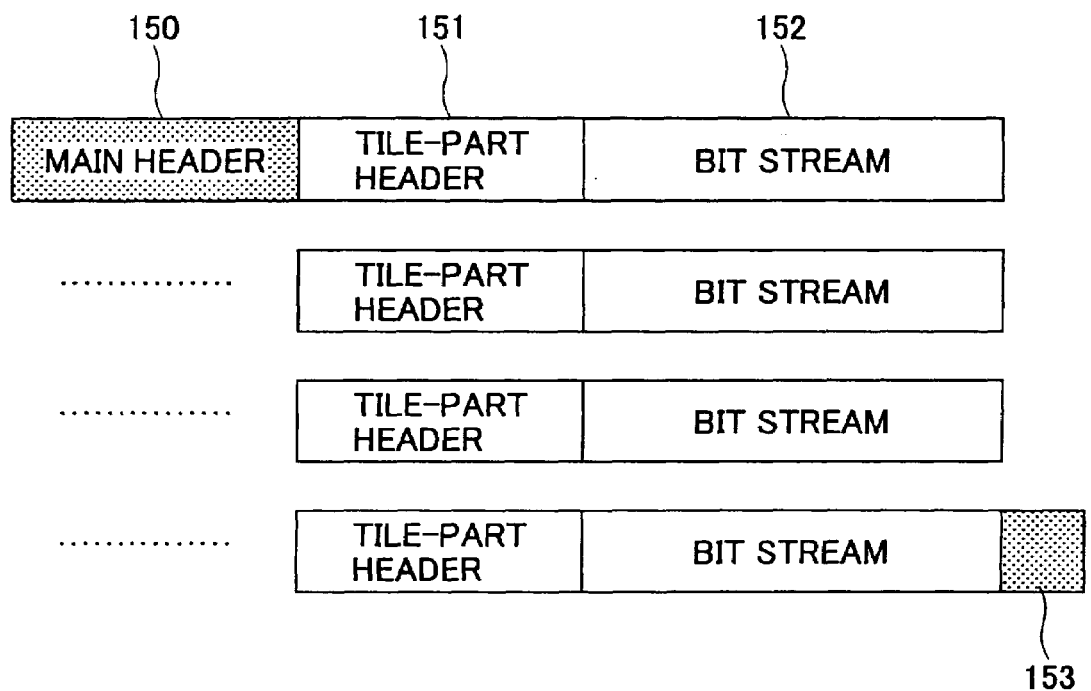
FIG. 7 is a data diagram showing the structure of a codestream.

FIG. 7 is a data diagram showing the structure of a codestream. Tag information called a main header 150 and tile-part headers 151 are attached to the top of the codestream and the top of each tile-part structuring each tile, respectively. The encoded data (bit stream 152) of each tile follow the tile-part header 151. A tag 153 (End of codestream) is attached to the end of the codestream.

Contrary to the encoding process, image data are reproduced from the codestream of each tile of each component in the decoding process. The decoding process is described below with reference to FIG. 2.

The tag processing unit 114 interprets tag information attached to the input codestream, and divides the input codestream into codestreams of each tile of each component. Decoding is performed by a codestream of each tile of each component. The position of an object bit is determined in the order based on the tag information provided to the codestream. The inverse quantizing unit 112 generates context based on bits (that are already decoded) adjacent to the object bit. The entropy decoding unit 113 performs decoding based on the context and the codestream by stochastic estimation. The object bit is decoded accordingly and stored at the position.

As described above, the decoded data are spatially divided by frequency range. The image data of each tile of each component are restored by performing two-dimensional wavelet inverse transformation by the 2D wavelet inverse transforming unit 111. The restored data are converted into data represented by their source color space by the color space inverse converting unit 110.

Inverse processing of conventional JPEG codes is basically the same as inverse processing of JPEG 2000 codes, but is different only in that 8×8 pixel rectangular blocks instead of the tiles are transformed by JPEG two-dimensional discrete cosine transformation.

General processing of still images is described above. JPEG and JPEG 2000 also become applicable to motion pictures. A motion picture can be structured with a plurality of frames, each being a still picture, that are framed at an appropriate frame speed. The motion picture can be reproduced by displaying the plurality of still pictures at the frame speed. This technique is called motion compression/decompression processing of still pictures. Compared with MPEG, which is widely used for motion pictures, this technique has an advantage in that each frame is a still picture of high quality. Accordingly, the motion compression/decompression processing of still pictures is drawing the attention of business users such as broadcasters. It is probable that this technique will pervade to consumers.

[Structure of Image Forming Apparatus]

A preferred embodiment of the present invention is described below.

Figure 8:
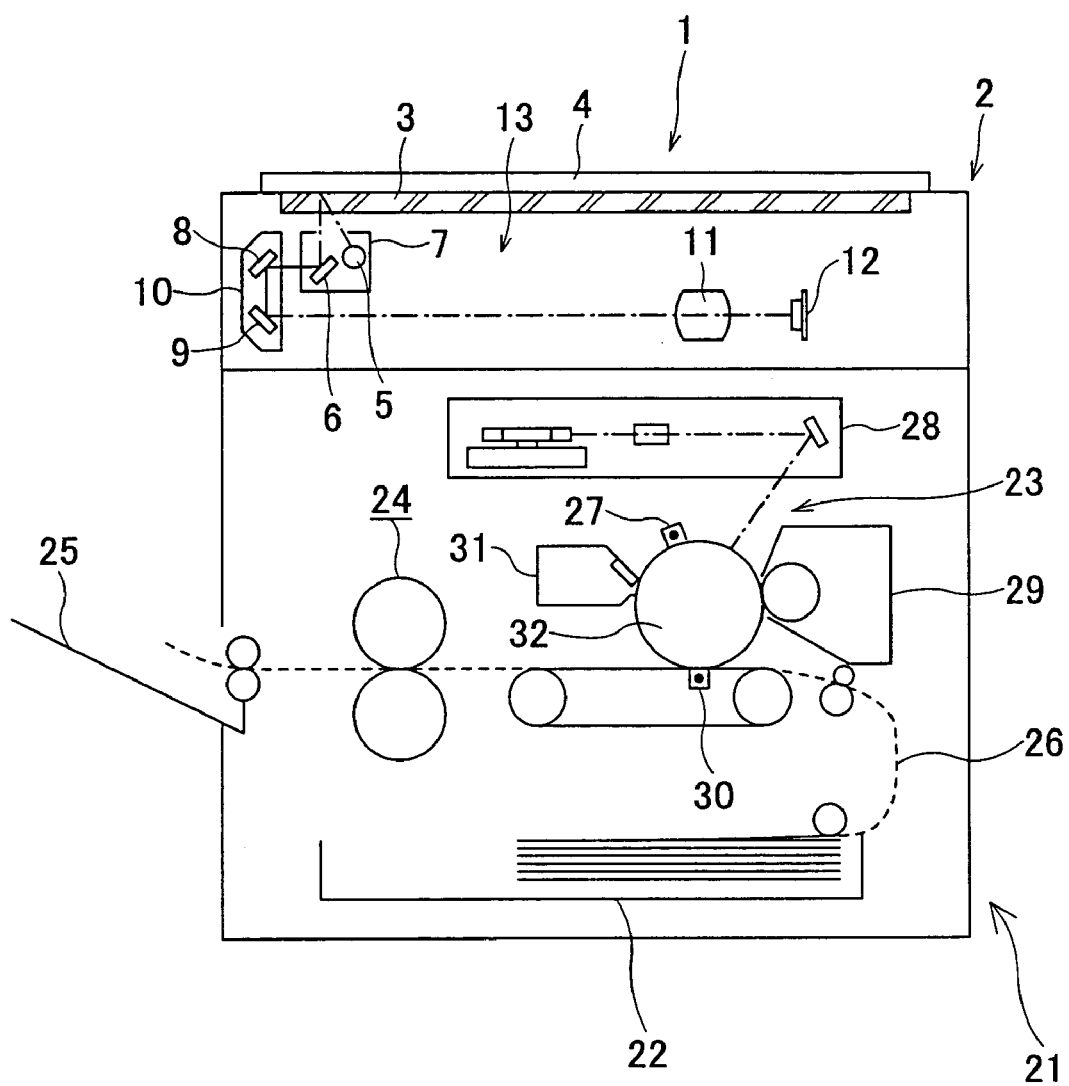
FIG. 8 is a cross-section of an image forming apparatus according to an embodiment of the present invention.

FIG. 8 is a cross-section of an image forming apparatus according to an embodiment of the present invention. The image forming apparatus 1 is provided with an image reading unit 2 and an image forming unit 21 that forms images on a recording medium such as a sheet of paper based on image data provided by the image reading unit 2. The image reading unit 2 is a scanner, for example, and the image forming unit 21 is a printer, for example.

A contact glass 3 is provided on the top of the chassis of the image reading unit 2. Although not shown, a document is placed on the contact glass 3 and read. The document is placed on the contact glass 3 with its face down. A platen cover 4 is provided above the contact glass 3 and retains the document.

Below the contact glass 3, the following are provided: a first moving unit 7 in which a light source 5 and a mirror 6 are provided, a second moving unit 10 in which two mirrors 8 and 9 are provided, and an optical system 13 in which a conversion lens 11 and a charge coupled device (CCD) image sensor 12 are provided. The light radiated by the light source 5 is reflected by the document. The reflective light is led to the conversion lens 11 through the mirrors 6, 8, and 9. The converged reflective light is detected by the CCD image sensor 12. The CCD image sensor 12 is an optoelectronic device for converting the converged reflective light into optoelectronic conversion data. The optoelectronic conversion data are represented by voltages depending on the intensity of the reflective light.

The first and second moving units 7 and, 10 can move back and forth along the contact glass 3. In a reading operation (described below), the first and second moving units 7 and 10 move at a speed ratio of 2:1. As the first and second moving units 7 and 10 move along the contact glass 3, the document is scanned by the optical system 13.

The image forming unit 21 is provided with a medium path 26 along which a medium container 22, an electrophotography type printer engine 23, a fixing unit 24, and a discharge unit 25 are provided.

The printer engine 23 is provided with a charge unit 27, an exposure unit 28, a development unit 29, a transfer unit 30, a cleaner unit 31, and a photosensitive body 32. The printer engine 23 forms a toner image on the photosensitive body 32 by electrophotography, transfers the formed toner image to the recording medium, and fixes the transferred toner image with the fixing unit 24. The printer engine 23 forms images by electrophotography in this case. However, the printer engine 23 may use another image forming technique such as an ink jet system, a sublimation type thermal transfer system, and a direct thermal system.

Figure 9:
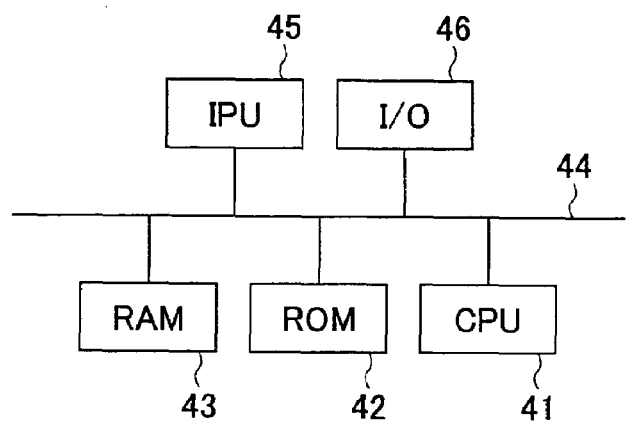
FIG. 9 is a block diagram showing the hardware structure of a controller of the image forming apparatus shown in FIG. 8.

The image forming apparatus 1 is controlled by a controller including a plurality of microprocessors. FIG. 9 is a block diagram showing the structure of the controller. The controller is configured by a central processing unit (CPU) 41, a read only memory (ROM) 42, a random access memory (RAM) 43, an image processing unit (IPU) 45, and an input/output port (I/O) 46 connected via a bus 44. The CPU 41 performs various computations and centrally controls processing such as image processing. The ROM 42 stores therein various programs and fixed data that are used by the CPU 41. The RAM 43 provides the CPU 41 a working memory region. The IPU 45 is provided with various hardware devices for processing images.

The ROM 42 is provided with a non-volatile memory such as a flash memory. The program stored in the ROM 42 can be replaced with a program to be downloaded from an external source (not shown) through the I/O port 46. The CPU 41 also controls such a replacement.

Figure 10:
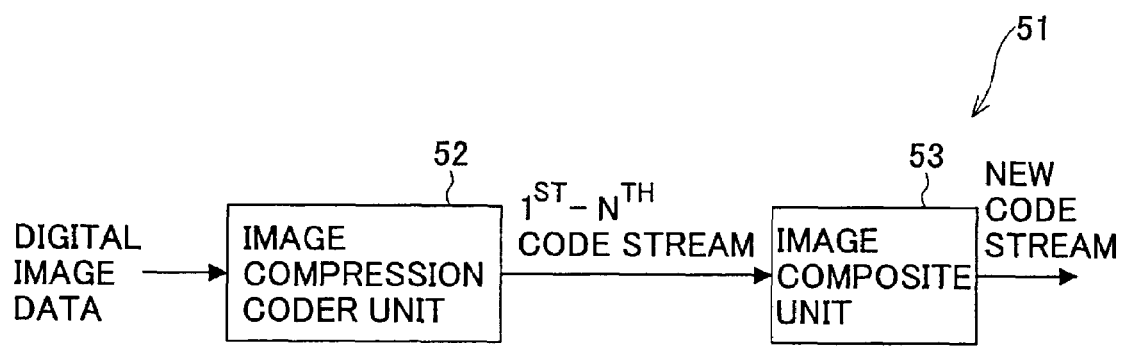
FIG. 10 is a block diagram showing the functional structure of the image processing apparatus according to an embodiment of the present invention.

FIG. 10 is a functional block diagram showing an image processing apparatus 51. The image processing apparatus 51 includes an image compression encoding unit 52 and an image composite unit 53. The image compression encoding unit 52 realizes an image compression coding unit. The image compression encoding unit 52 converts an image into a codestream using the JPEG 2000 algorithm. (The image is read by the image reading apparatus 2, and may be processed by the IPU 45. The processing by the IPU 45 may include white shading adjustment, for example.) For the conversion, the image compression encoding unit 52 divides the image into one or more rectangular regions (tiles) and transforms pixel values of each rectangular region with the discrete wavelet transformation into compression codes. The encoding is performed hierarchically. The image composite unit 53 composites codestreams of a plurality of images into a composite image.

The image compression coding unit 52 includes the functional blocks described with reference to FIG. 2, and encodes the images into compression codes with the JPEG 2000 algorithm described above. The function of the image compression encoding unit 52 may be performed by hardware included in the IPU 45, or may be performed by the CPU 41 that runs a program stored in the ROM 42. The function of the image composite unit 53 may be performed by hardware included in the IPU 45, or may be performed by the CPU 41 that runs a program stored in the ROM 42.

Figure 11:
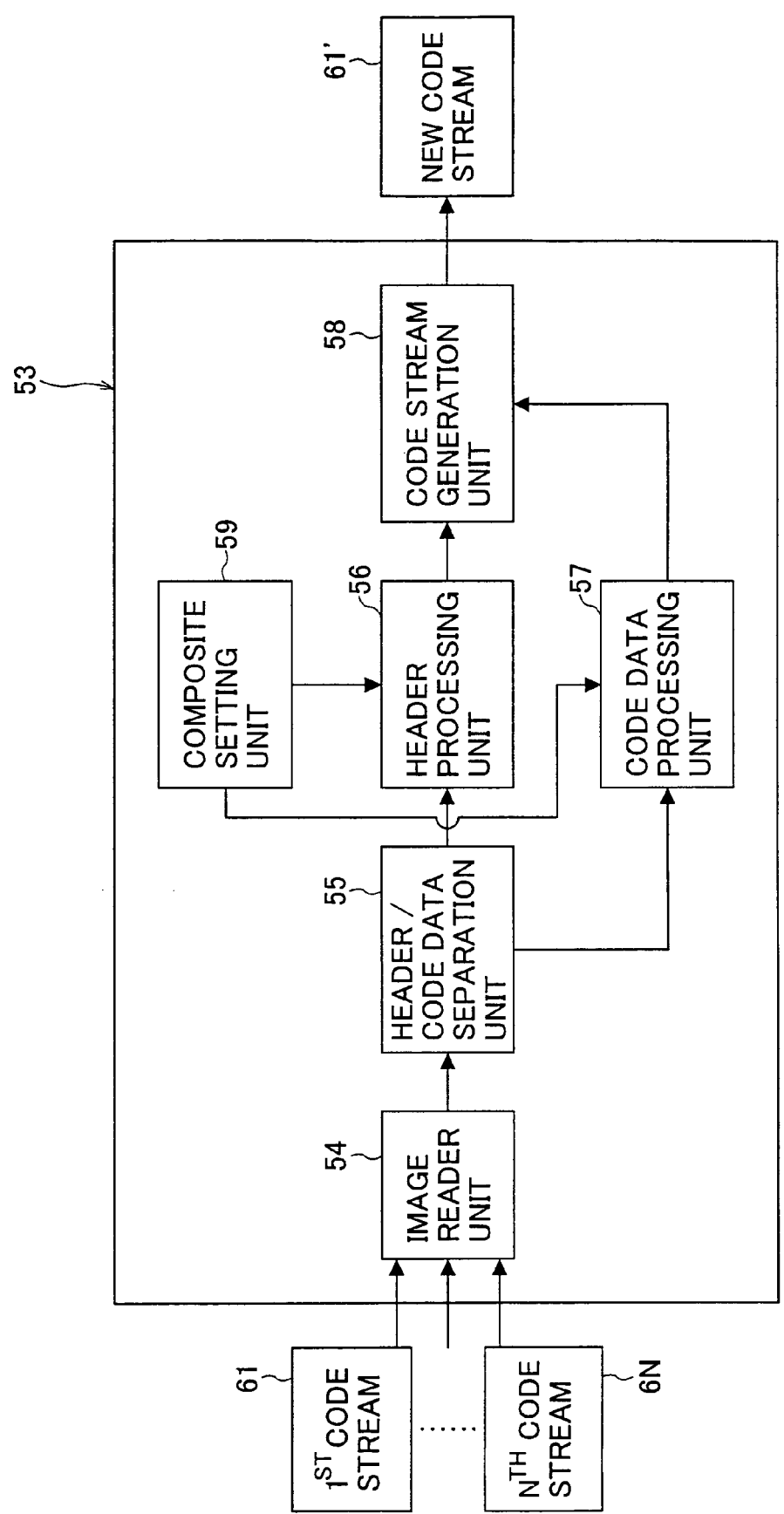
FIG. 11 is a block diagram showing the functional structure of an image compositing unit according to an embodiment of the present invention.

FIG. 11 is a block diagram showing the functional structure of the image composite unit 53. The image composite unit 53 includes an image reading unit 54, a header/code data separation unit 55, a header processing unit 56, a code data processing unit 57, a codestream generation unit 58, and a composite setting unit 59.

The operation of the image composite unit 53 in which a plurality of component images are composited into one composite image is described. It is assumed that each codestream input to the image composite unit 53 is structured by a tile of the same size. However, those skilled in the art easily understand that the embodiment of the present invention is not limited to this case.

A user operates an operations panel (not shown) of the image forming apparatus 1 so as to composite a plurality of images into a composite image. The image reading unit 2 reads the plurality of images (of documents) into a plurality of items of digital image data. The digital image data may be processed by the IPU 45 for a white shading adjustment, for example. The digital image data are encoded into a plurality of codestreams, and output to the image composite unit 53.

The user designates through the operations panel (not shown) the number of images that the user desires to composite into one image (one page), and the composite setting unit 59 determines the number of images to be arranged in the horizontal and vertical directions. The composite setting unit 59 embodies a composite setting unit. For example, if the user desires to composite four images into one page, the number of images arranged in the horizontal directions and the vertical directions may be 2×2, respectively. The image reading unit 54 reads the codestreams to be composited one by one.

The first codestream 61 is read, and separated into the header portion and the code data portion by the header/code data separation unit 55. The header processing unit 56 adjusts the image size of the main header to the image size after compositing. The composite setting unit 59 determines the image size after compositing. The header processing unit 56 generates a new tile-part header, and attaches a tile index to the generated tile-part header.

Then, the image reading unit 54 reads the second or higher codestream 62, 63, . . . , and the header/code data separation unit 55 separates them into headers and code data. The header processing unit 56 converts the main headers into tile-part headers. A tile index is attached to each tile-part header. The headers of all image data are processed in the same manner.

The code data processing unit 57 embodies a code data processing unit. The code data processing unit 57 extracts only predetermined code data out of each item of code data separated by the header/code data separation unit 55. Specifically, the code data processing unit 57 extracts only wavelet transform coefficients of a specific layer. The code data processing unit 57 outputs the extracted code data to the codestream generation unit 58.

The codestream generation unit 58 embodies a codestream generation unit. The codestream generation unit 58 generates a codestream in compliance with the requirement of JPEG 2000 based on the header generated by the header processing unit 56 and the code data extracted by the code data processing unit 57. As a result, a new codestream 61' representing an image in which the plurality of images are composited is generated. This codestream 61' is used by the printer engine 23. That is, the codestream 61' is stored in an image memory (not shown), and printed by the printer engine 23 after being expanded by an image expanding apparatus.

Figure 12:
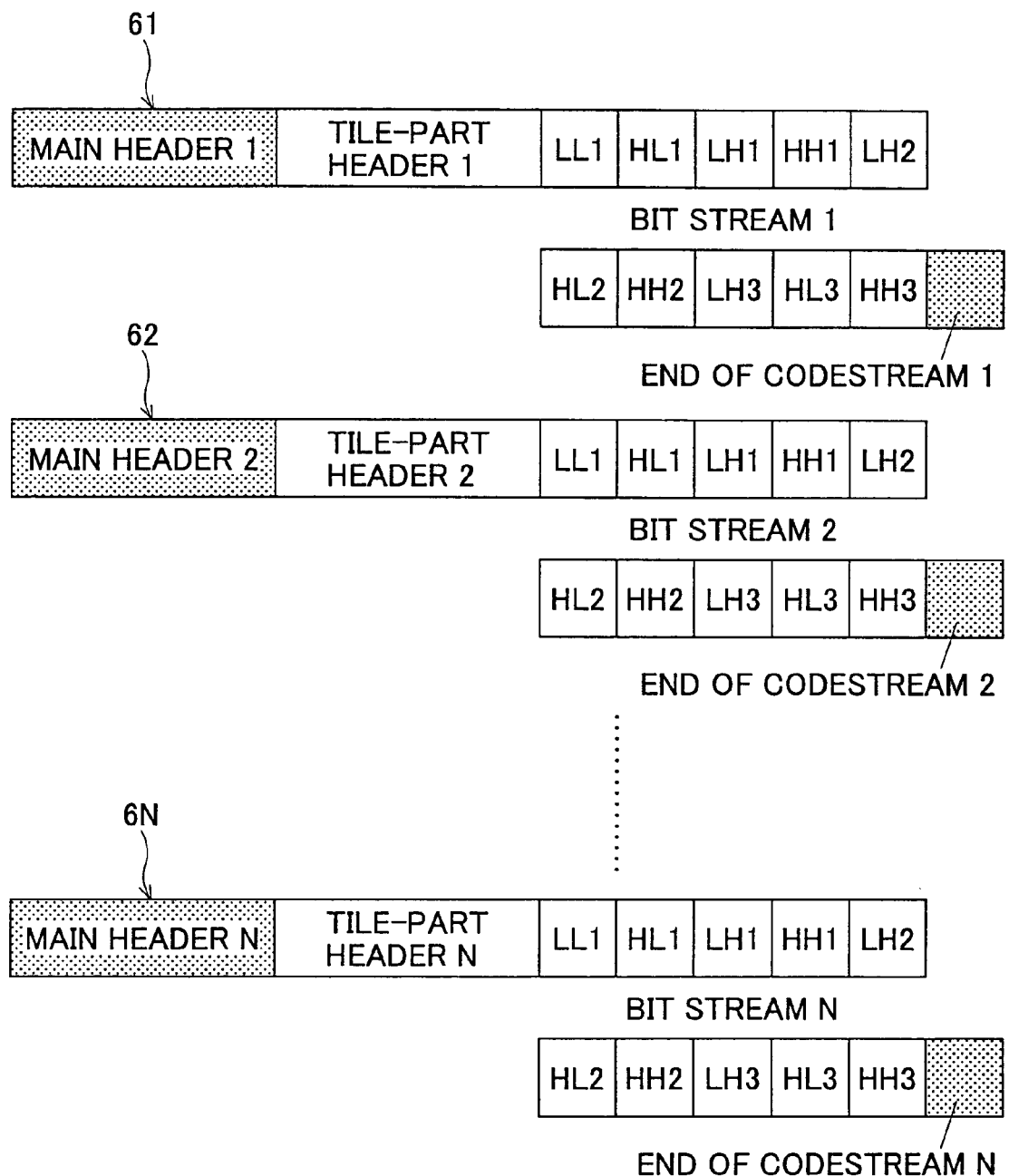
FIG. 12 is a data diagram for explaining the structure of a plurality of codestreams before compositing.

FIG. 12 is a data diagram for explaining the structure of a plurality of codestreams before being composited by the image composite unit 53. FIG. 12 shows the following: the main header, the tile-part header, a bit stream, an end of codestream (EOC) marker of the first codestream 61; the main header, the tile-part header, a bit stream, an EOC marker of the second codestream 62; . . . ; and the main header, the tile-part header, a bit stream, an EOC marker of the n-th codestream 6N.

Figure 13:
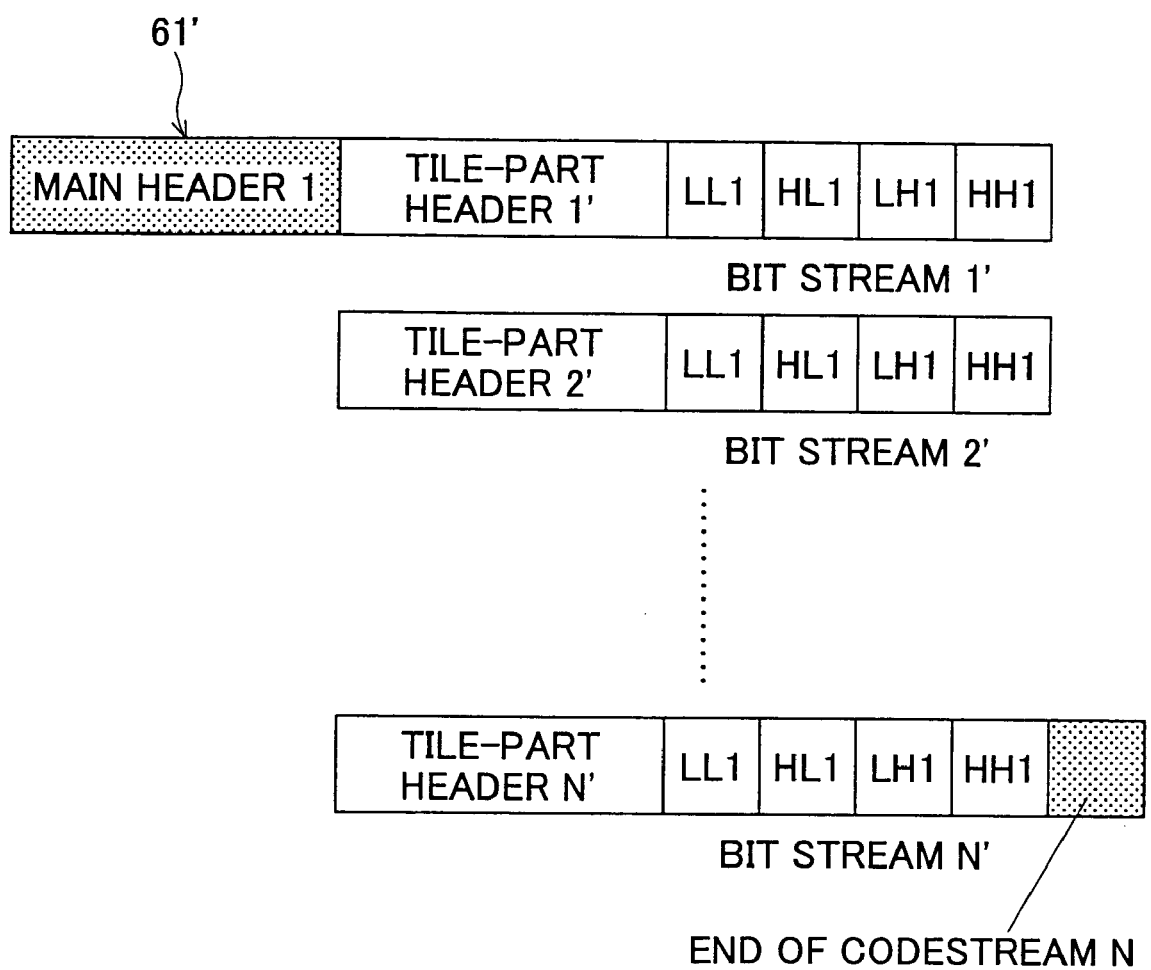
FIG. 13 is a data diagram for explaining the structure of a codestream after compositing.

FIG. 13 is a data diagram for explaining the structure of the codestream after compositing by the image composite unit 53. FIG. 13 shows the main header, a tile-part header, a bit stream, another tile-part header, another bit stream, yet another tile-part header, yet another bit stream, and the EOC marker of the codestream 61' of the composite image. The codestream 61' of the composite image includes only the wavelet coefficients LL1, HL1, LH1, and HH1 of the decomposition level 1 of each component image.

Figure 14:
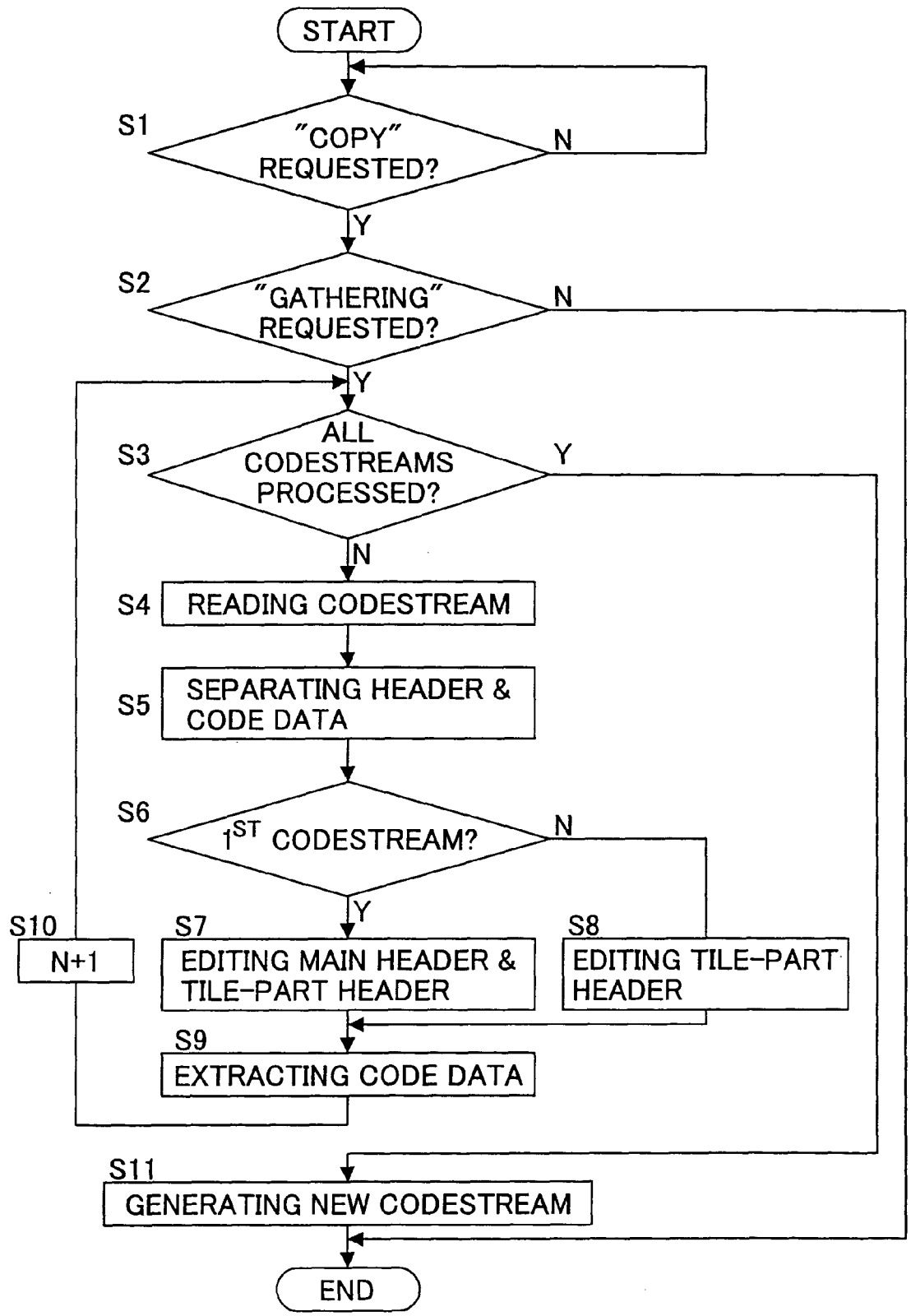
FIG. 14 is a flow diagram for explaining an exemplary operation of the image forming apparatus for compositing a plurality of component images.

FIG. 14 is a flow diagram for explaining processing of the image forming apparatus 1 for compositing a plurality of images.

When the user gives a request for photocopying ("Yes" in step S1), a determination is made whether the user gives a request for compositing a plurality of images (step S2). If a negative determination is made ("No" in step S2), the process is terminated.

If a determination is made that the user gives a request for compositing a plurality of images ("Yes" in step S2), a determination is made whether the image reading unit 54 has read all codestreams that are to be composited (step S3). If the image reading unit 54 has already read all codestreams ("Yes" in step S3), the process proceeds to step S11. If not yet ("No" in step S3), the remaining images are read (step S4). The header/code data separation unit 55 separates the codestream into the header portion and the code data portion (step S5). Step S5 embodies the step of separating header/code data.

Then, a determination is made whether the read codestream is the first codestream (step S6). If the read codestream is the first codestream ("Yes" in step S6), the main header and the tile-part header after compositing are generated by the header processing unit 56 based on the main header and the tile-part header of the read codestream (step S7). If the read codestream is not the first codestream ("No" in step S6), the tile-part header after compositing is generated by the header processing unit 56 based on the main header and the tile-part header of the read codestream (step S8). Steps S7 and S8 embody the step of processing the header. As described above, the wavelet transform coefficients of a decomposition level are extracted (step S9). Step 9 embodies the step of processing code data.

Then, a counter for counting the number of the read codestreams is incremented by one (step S10). The process returns to step S3. The steps from S3 through S10 are repeated until all codestreams to be composited are processed. When all the codestreams to be composited are processed ("Yes" in step S3), the new codestream after compositing is generated (step S11). Then, the process is terminated. Step S11 embodies the step of generating a codestream.

Figure 15:
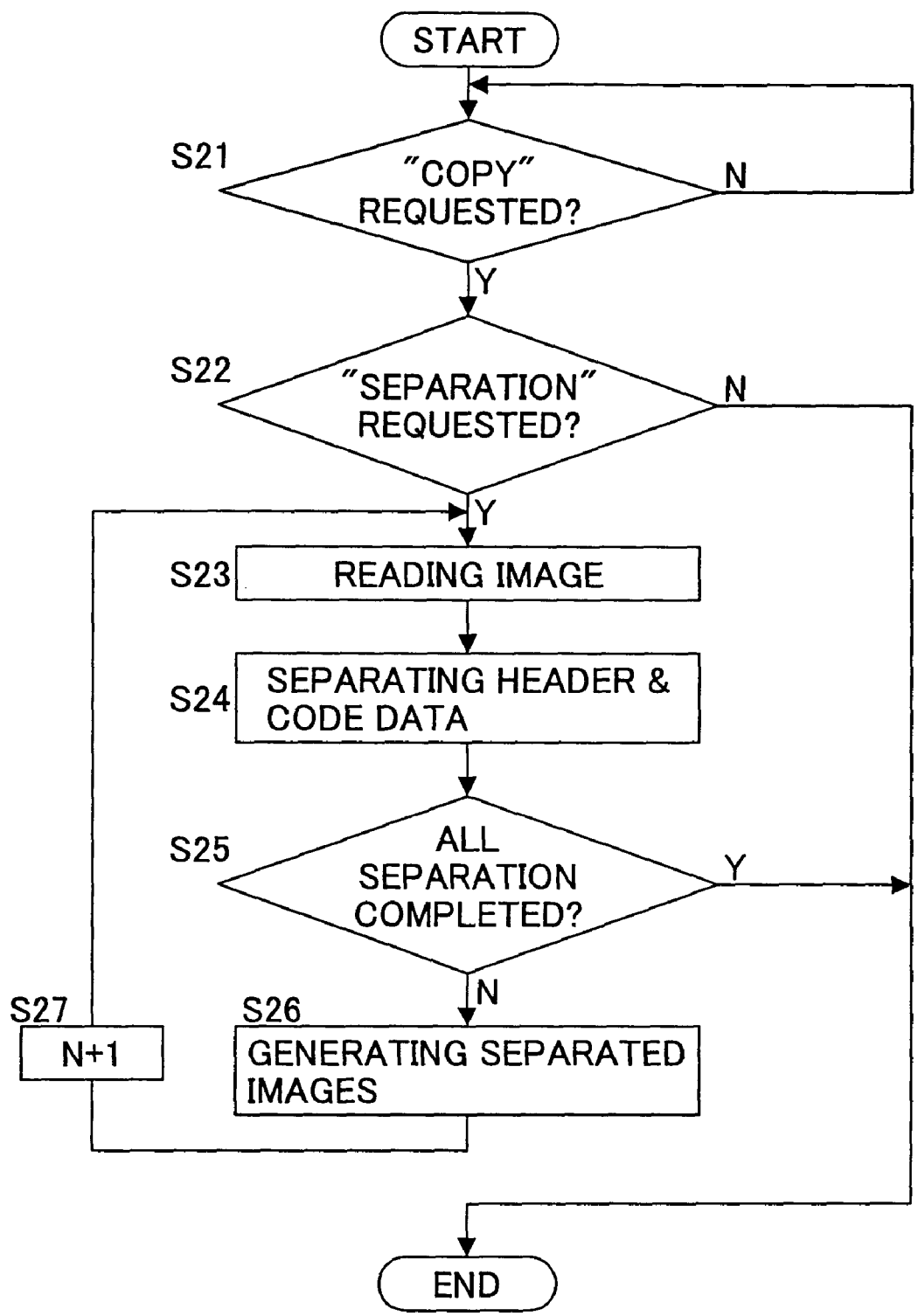
FIG. 15 is a flow diagram for explaining an exemplary operation of the image forming apparatus for decompositing a composite image.

FIG. 15 is a flow chart of the operation of the image forming apparatus 1 in which a composited codestream is separated (decomposited) into a plurality of codesteams. When the user gives an instruction for copying ("Yes" of step S21), the image forming apparatus 1 further determines whether the user gives an instruction for separating by using the operations panel (not shown)(step S22). If the user does not instruct to separate an image ("No" in step S22), the process ends. If the user instructs to separate an image ("Yes" in step S22), the image reading unit 54 reads the codestream of the composite image (step S23). The header/code data separation unit 55 separates the read codestream (step S24). Step S24 realizes a step of separating header and code data.

A determination is made whether all separations have been completed (step S25). If a determination is made that all separations have been completed ("Yes" in step S25), the process ends. If a determination is made that all separations have not been completed ("No" in step S25), the header processing unit 56 edits the separated header. The codestream generating unit 57 generates a new codestream by adding a new header to the separated code data. Accordingly, the image is separated into a plurality of images (step S26). Step S26 realizes a step of generating a new codestream. Then, a counter for counting the number of separated images is incremented (step S27). The process returns to step S25. Steps S25 through S27 are repeated until all separations are completed. When all separations have been completed, the process ends.

As described above, if there is a composite image with four images (two in the width directions and two in the height directions) composited therein, the user can instruct the image forming apparatus to separate the composite image into four separated component images by using the operations panel (not shown).

In response to the instruction from the user, the scanner 2 reads the composite image. The image compression coder unit 52 generates a codestream as shown in FIG. 13 in which the scanned composite image is divided into four (2×2) images. The codestream is separated into headers and code data (step S24), and four codestreams, such as shown in FIG. 12, in which each item of code data is a tile, are formed (step S26). Each codestream is printable by the printer 21. Accordingly, the composite image is separated into four printed component images.

As described above, the image processing apparatus 51 can composite a plurality of images into a composite image and separate the composite image into a plurality of images. However, the image processing apparatus 51 may be structured to process only one of the two functions.

In the above description, it is assumed that each codestream to be composited is formed by a single tile in order to make the description easy. Even if each codestream to be composited is formed by a plurality of tiles, images can be composited in almost the same manner as described above except that there is a minor difference in attaching tile indexes.

It is also assumed that each image composited in the composite image is formed by a single tile in order to make the description simple. Each image composited in the composite image may be formed by a plurality of tiles. In this case, a codestream is generated for each group of tiles that forms an image.

According to the above embodiment, the image processing apparatus 51 is built into the image forming apparatus 1. According to another embodiment, the image processing apparatus 51 may be applied to various electronics apparatuses. For example, the image forming apparatus 51 may be embodied by an application program running on an information processing apparatus such as a personal computer. In this case, the image processing apparatus can composite various image data. The application program may be provided stored in an optical disk, an optical-magnetic disk, and a flexible disk, for example. According to another embodiment, the application program may be downloaded via a network such as the Internet.

The preferred embodiments of the present invention are described above. The present invention is not limited to these embodiments, but various variations and modifications may be made without departing form the scope of the present invention.

This patent application is based on Japanese Priority Patent Applications No. 2002-244877 filed on Aug. 26, 2002, and No. 2003-001227 filed on Jan. 7, 2003, the entire contents of which are hereby incorporated by reference.

What is claimed is:

1. An image processing apparatus for compositing a plurality of component images into a composite image, comprising:
   a separating unit that separates a codestream corresponding to each one of the component images into a header portion and a data portion, wherein said codestream is generated by dividing the corresponding one of the component images into one or more rectangular regions, transforming pixel values of the divided one or more rectangular regions with discrete wavelet transform into transform coefficients, and compressing said transform coefficients;
   a header processing unit that edits said separated header portion so as to composite the component images into said composite image; and
   a codestream generation unit that generates a codestream corresponding to said composite image by combining the edited headers and the separated data portions.

2. The image processing apparatus as claimed in claim 1, further comprising a composite designating unit that designates a number of the component images to be composited in said composite image;
   wherein
   said header processing unit edits said separated header portion based on the designated number of the component images.

3. The image processing apparatus as claimed in claim 2, wherein said composite designating unit designates at least one of the number of the component images in horizontal directions and the number of the component images in vertical directions.

4. The image processing apparatus as claimed in claim 1, further comprising a code data processing unit that extracts predetermined code data from said separated data portion.

5. An image processing apparatus for decompositing a composite image into a plurality of component images, comprising:
   a separating unit that separates a codestream corresponding to said composite image into a plurality of header portions and a plurality of data portions, wherein said codestream is generated by dividing the corresponding composite image into one or more rectangular regions, transforming pixel values of the divided one or more rectangular regions with discrete wavelet transform into transform coefficients, and compressing said transform coefficients;
   a header processing unit that edits said separated header portions for a plurality of new codestreams corresponding to said component images; and a codestream generation unit that generates the new codestreams corresponding to said component images by combining the edited headers and the corresponding separated data portions.

6. An image forming apparatus, comprising:

an image input unit that reads an image of a document;

an image compression coder unit that generates a single codestream by dividing the read image into one or more rectangular regions, transforming pixel values of the divided one or more rectangular regions with discrete wavelet transform into transform coefficients, and compressing said transform coefficients;

the image processing apparatus as claimed in claim 1; and a printer engine that forms an image on a recording medium based on each codestream generated by said codestream generation unit of said image processing apparatus.

7. A computer readable storage medium encoded with computer executable instructions which causes a computer to implement a method of compositing a plurality of component images into a composite image, comprising:

separating a codestream corresponding to each one of the component images into a header portion and a data portion, wherein said codestream is generated by dividing the corresponding one of the component images into one or more rectangular regions, transforming pixel values of the divided one or more rectangular regions with discrete wavelet transform into transform coefficients, and compressing said transform coefficients;

processing said separated header portion so as to composite the component images into said composite image; and generating a codestream corresponding to said composite image by combining the edited headers and the separated data portions.

8. The computer readable storage medium as claimed in claim 7, wherein the method further comprises designating a number of the component images to be composited in said composite image;

wherein said separated header portion is edited based on the designated number of the component images.

9. The computer readable storage medium as claimed in claim 8, wherein at least one of the number of the component images in horizontal directions and the number of the component images in vertical directions are designated.

10. The computer readable storage medium as claimed in claim 7, wherein the method further comprises extracting predetermined code data from said separated data portion.

11. A computer readable storage medium encoded with computer executable instructions which causes a computer to implement a method of decompositing a composite image into a plurality of component images, comprising:

separating a codestream corresponding to said composite image into a plurality of header portions and a plurality of data portions, wherein said codestream is generated by dividing the corresponding composite image into one or more rectangular regions, transforming pixel values of the divided one or more rectangular regions with discrete wavelet transform into transform coefficients, and compressing said transform coefficients;

editing said separated header portions for a plurality of new codestreams corresponding to said component images; and generating the new codestreams corresponding to said component images by combining the edited headers and the corresponding separated data portions.

* * * * *